Figure 1:
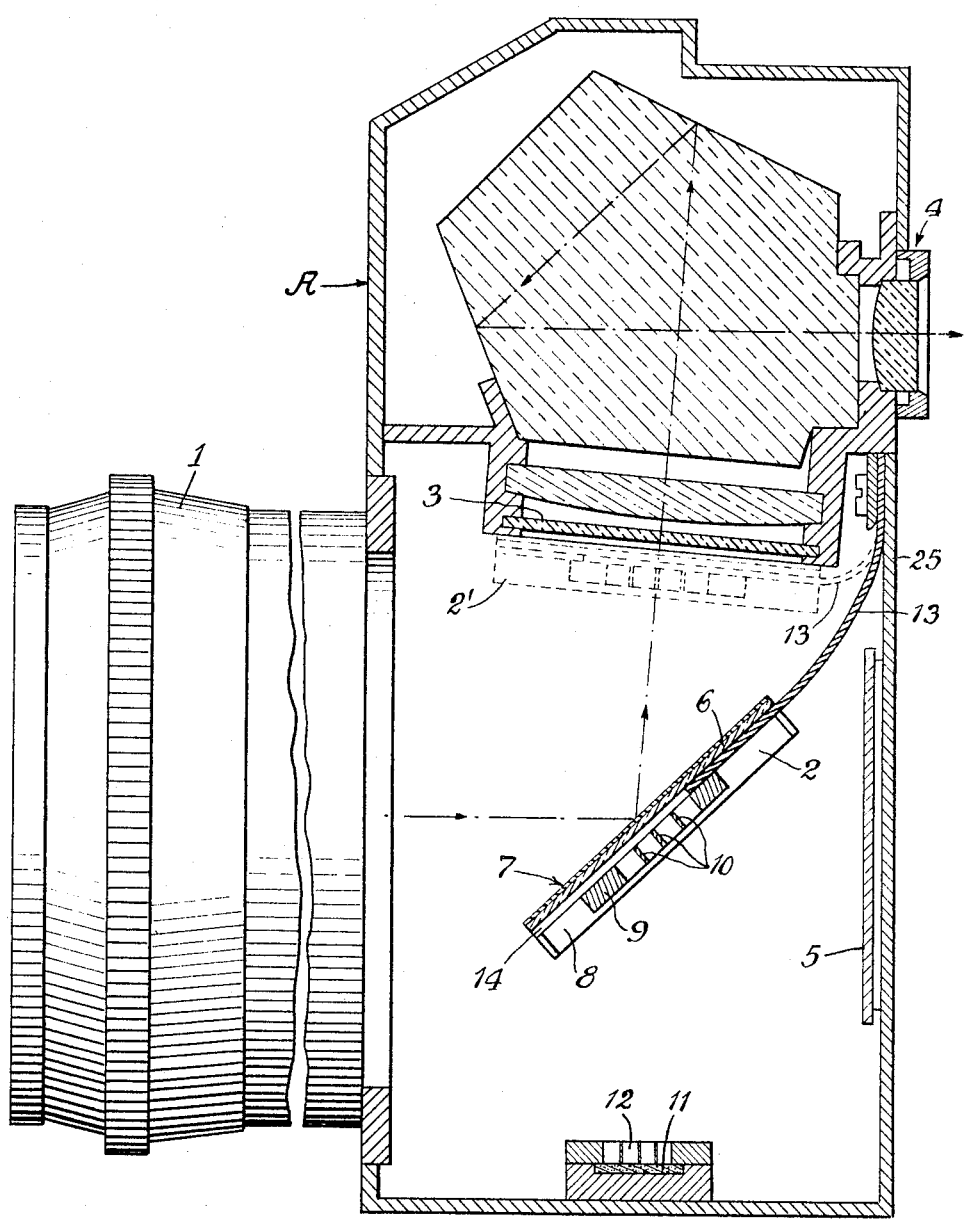

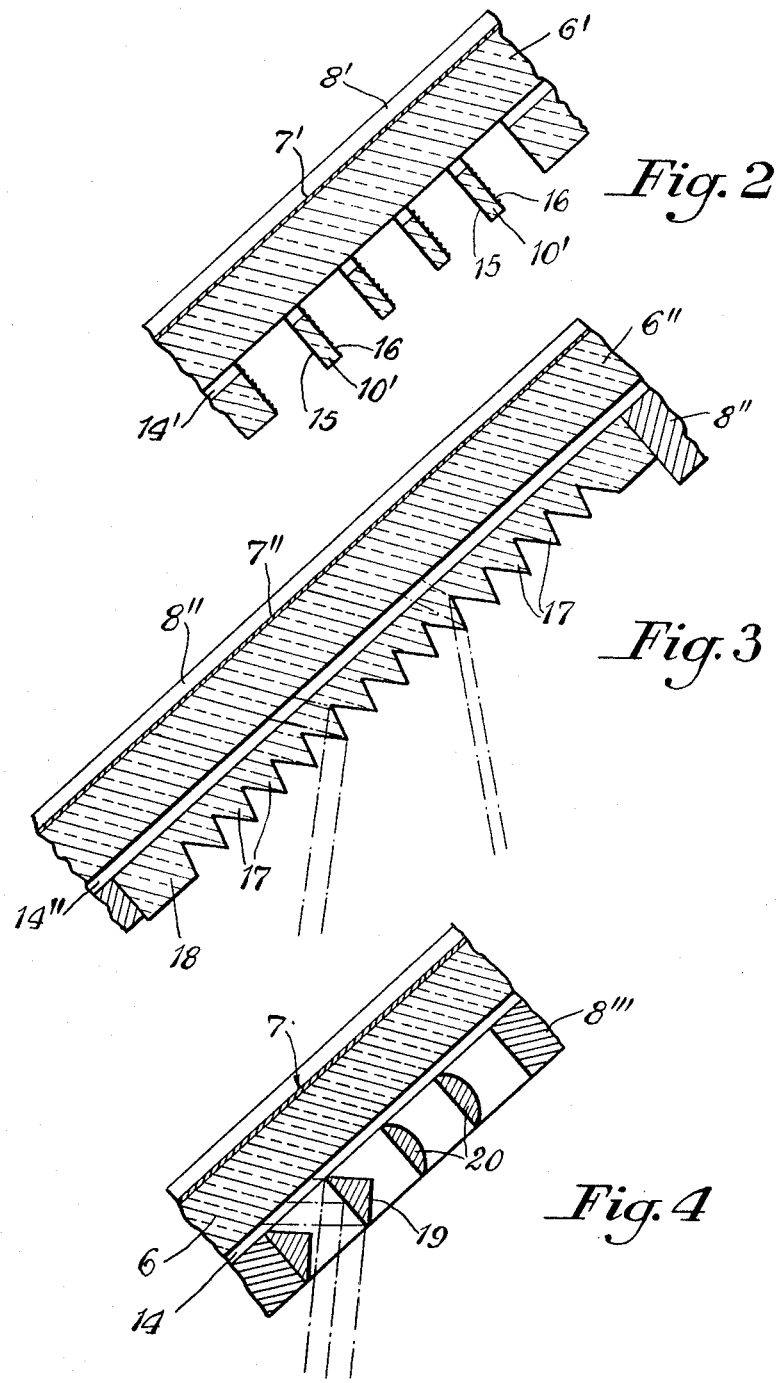

Oct. 25, 1966 W. GÜNTHER ETAL 3,280,714
MIRROR REFLEX CAMERA
Filed July 8, 1964 3 Sheets-Sheet 3

United States Patent Office 3,280,714
Patented Oct. 25, 1966

3,280,714
MIRROR REFLEX CAMERA
Willi Günter, Stuttgart-Mohringen, Werner Zink, Aich, Kreis Nurtingen, and Helmut Ebertz, Stuttgart-Mohringen, Germany, assignors to Zeiss Ikon Aktiengesellschaft, Stuttgart, Germany
Filed July 8, 1964, Ser. No. 381,162
Claims priority, application Germany, July 12, 1963, Z 10,223
14 Claims. (Cl. 95—42)

The invention relates to a single lens mirror reflex camera which for the purpose of measuring the exposure of the film has arranged in its exposure chamber, preferably on the bottom thereof, a photoelectronic construction element (hereinafter referred to as photoelectric element) which will receive its light from the camera objective by means of light beam deflecting means.

The arrangement of the photoelectric element within the exposure chamber has a number of advantages. The light measurement takes place under the same optical conditions as the exposure of the film. The electrical connections between the photoelectric element and the indicating instrument may be fixedly installed. Flexible connections which may be susceptible to trouble can be dispensed with. A disadvantage of this camera type is, however, that in addition to the deflecting mirror to be moved into the objective light beam for illuminating the photoelectric element also a folding mirror for producing the viewfinder image is required, and heretofore, it was not possible to swing both mirrors at the same time into the light beam passing through the camera objective. The deflecting means had to be moved individually and this resulted in a time parallax between the observation of the viewfinder image and the measuring of the light, so that the position of the object to be photographed may have changed during the light measurement or, in turn, the light conditions may have changed during the viewing and focusing procedure. Such a time parallax occurs also when only one mirror is used which is first brought into the viewfinder position and subsequently into the light measuring position.

It is an object of the invention to arrange the light deflecting means for the light measurement in rear of the conventional viewfinder folding mirror with respect to the direction of the incoming light, whereby this mirror is made partly transparent in at least some portions. This light deflecting means is then so arranged that it is moved with the foldable mirror out of the light beam of the camera objective. In this manner it is possible to carry out the focusing and the light measuring at the same time. No time parallax will occur.

The pivotable deflecting means, as for example a single or multiple part mirror, may be operatively connected with the usual means for operating the viewfinder in a reflex camera, as for example a folding mirror, so that the deflecting means does not require its own operating mechanism. Since such an operating mechanism has to perform additional camera functions in a predetermined succession, it is desirable to connect the deflecting means fixedly with the folding mirror.

To this end the invention provides the necessary prerequisite in that the light beam deflecting means consists of a plurality of reflective surfaces which are arranged transverse to the camera light beam and preferably are uniformly spaced from each other. Each one of these reflective surfaces deflects, substantially unaffected by surrounding reflective surfaces, a part of the objective light beam employed for measuring the light.

This multitude of reflective surfaces may be arranged on a separate support and may be operatively connected with the foldable viewfinder mirror. It is, however, more expedient to connect this deflecting means fixedly with the folding mirror. It may even be combined with the folding mirror so as to form a single unit. For instance, the carrier of the mirror which is used for producing the viewfinder image may be provided with ribs uniformly distributed over the width of the mirror, and these ribs may be made of plastics and the reflective coatings may subsequently be applied to the respective faces of these ribs. By the selected subdivision of the deflecting means into a plurality of individual reflective faces of a small width which are fixedly connected with the folding mirror it is made certain that these reflective faces in the exposure position of the folding mirror do not influence the objective light beam. Since the reflective faces in this position permit light from the viewfinder device to enter into the exposure chamber, measures have to be taken to prevent this. For example, the light deflecting means in the exposure position may be prevented from admitting light from the viewfinder mechanism by covering it, the deflecting means, with a shutter plate. It is also possible to arrange each one of the reflective faces pivotally about an axis so that in the focusing position they will illuminate the photoelectric element, and in the exposure position they will—being pivoted about 90° and possibly overlapping each other—cover up the viewfinder shaft. The pivoting of the individual reflective faces is purposefully done in dependence of the adjustment motion of its carrier, i.e. of the folding mirror if the reflective faces are pivotally arranged on the same.

Another way to prevent the light exit from the viewfinder arrangement consists in the employment of a light flap which is arranged preferably near the ocular and is controlled directly or indirectly by the movement of the deflecting means or the folding mirror, respectively.

The light exit from the viewfinder shaft in the exposure position of the folding mirror can further be prevented in that a flexible strip is inserted into the space between the glass plate coated with the reflecting layer and the frame in which the reflective bars are arranged. This strip is attached with one of its ends to the camera casing near the view finder shaft and above the focusing plate. The length of this strip is such that its free end in the exposure position of the camera covers all openings between the bars, whereas in the focusing position all these openings are free.

When the folding mirror is in the focusing position, the reflective surfaces may permit light from the viewfinder to fall on the photoelectric element which will falsify the measuring result. For this reason the sides of the reflective faces directed to the viewfinder arrangement are made impervious to light by coating them, for example, with a black varnish.

The photoelectric element may have arranged in front of it a Venetian blind-type diaphragm for the purpose of preventing a reflection of the light rays of the objective to the film plane.

Another possibility to prevent such reflection is to arrange the photoelectric element in a recess in the camera bottom so that the rim of this recess acts as a diaphragm.

The deflecting means according to the invention may also consist of a plurality of prisms so arranged that the light beam coming from the objective is reflected in toto by one of the prism faces. These prisms are preferably made of one unit with their transparent carrier and may further be combined with the glass plate provided with a reflecting layer so as to form one structural unit.

It is generally desirable to arrange the photoelectric element in a plane conjugated to the film plane. Since the reflective faces of the deflecting means in the focusing position are located at different distances from the film plane, the surfaces conjugate to the film plane and associated with the individual reflective faces are also located at different distances from the mirror. In order to accommodate the photoelectric element at least approximately in the plane conjugate to the film plane, the photoelectric element in accordance with the invention is arranged inclined to the bottom of the camera casing.

With these and other objects in view which will become apparent from the following description, the invention will now be desricbed with reference to the accompanying drawings in which:

FIG. 1 is a side elevation view of a single lens mirror reflex camera embodying the invention, partly in a vertical sectional view to illustrate the interior of the camera casing and the viewfinder, and FIGS. 2, 3 and 4 show each a different construction of the means for deflecting a portion of the light beam entering the camera through the camera objective onto the photoelectric element.

Referring to FIG. 1, the beam of light passing through the camera objective 1 which is mounted on the vertical front wall of the camera casing A is reflected by a folding mirror 2 arranged within the camera casing A, if the mirror 2 is in its focusing position, into the direction of the focusing plate 3, so that a true viewfinder image is produced in this plane and is viewed by the viewfinder ocular 4. For making an exposure on the film the folding mirror 2 is tilted upwardly into the position 2' and thus makes way for the objective light beam to illuminate the picture window 5 diagrammatically illustrated in FIG. 1. The folding mirror 2 comprises the glass plate 6 whose side facing the camera objective 1 is coated with a partly transparent mirror layer 7. This mirror layer 7 may extend over the entire area of the glass plate 6, or only over portions thereof and then preferably over the centrally located portions. The remainder of the glass plate 6 would then be coated with a totally reflecting layer. In such a case, however, the viewfinder image would appear to be of different brightness in different areas and for this reason it is more advantageous if the glass plate 6 is coated entirely with the partly transparent layer 7. The glass plate 6 is attached to a carrier 8 having a frame 9 in which the bars 10 are inserted which, for example, may consist of sheet metal strips. In the focusing position of the folding mirror 2 the light beam coming from the photographic objective 1 is partly permitted to pass through the partly transparent layer 7 and by means of the bars 10 is deflected to the photoelectric element 11 which is arranged on the bottom wall of the camera casing A and is electrically connected with an indicating instrument (not shown). In front of the photoelectric element is arranged a Venetian blind-type diaphragm 12 for the purpose of preventing a reflection of the exposure light beam passing through the camera objective 1 by the photoelectric element 11 in the direction of the picture window 5. The diaphragm 12 may be omitted if the photoelectric element 11 is built into a recess in the bottom wall of the camera casing so that the rim of this recess will act as a diaphragm.

Since the reflective bars 10 are located at different distances from the picture window, the planes associated with the individual strips and conjugate with the picture plane are arranged at different distances from the bottom wall of the camera casing. Corresponding to the position of these conjugated picture planes, the photoelectric element can be arranged inclined with respect to the lower camera wall so that it comes to lie at least approximately in a plane conjugate to the picture window.

The side walls of the bars 10 facing the photographic objective 1 are either provided with a reflective coating or are made of a material that is reflecting without any additional layer. The side walls of the bars 10 facing the viewfinder device are provided with a black lacquer coating for the purpose of absorbing all light in this direction. The spacing of the bars, their length and their alignment with respect to the mirrors 6, 7 are to be such that the light beam caught by the bars 10 will be deflected to the photoelectric element 11 as completely as possible, and that furthermore any light from the viewfinder shaft is prevented as completely as possible from entering the exposure chamber. The individual bars may be directed differently or may also be concave or convex in order to achieve a better focusing upon the photoelectric element 11.

When the folding mirror 2 is in the exposure position 2', light from the viewfinder shaft may penetrate through the openings between the bars 10 and into the exposure chamber. One way of preventing this consists in slidably inserting a flexible strip 13 into the space 14 between the glass plate 6 and the frame 9. One end of this strip 13 is fastened to the camera casing at a place above the focusing plate 3, i.e. to the vertical rear wall 25 of the camera casing. The length of this strip is such that in the exposure position 2' its free end covers positively all openings between the bars 10.

According to FIG. 2, the bars 10' may form together with the glass plate 6' a single integral member. That portion of the mirror support which embraces the glass plate 6' is designated with 8'. The side walls 15 of the bars 10' which face the photographic element are coated with a reflective layer; the other side walls 16 are coated with a black, light absorbing layer. In the central portions of the mirror the ribs 10' are separated from the glass plate 6' by a slot 14' for the insertion of the flexible strip 13 described in FIG. 1.

According to FIG. 3, the desired reflection of the objective light beam onto the photoelectric element is accomplished by totally reflecting prisms 17 which are united to form a prism plate 18. The prism plate 18 is connected to the mirror support 8". Also in this embodiment the support 18 may be made integral with the glass plate 6" wherein, however, a space 14" has to be provided for the flexible slidable shutter strip 13. The partly transparent mirror layer is designated with 7". The prism faces directed to the viewfinder device may be additionally provided with a black coating so as to shut out any light coming from this direction.

In accordance with FIG. 4, the bars 10 of FIG. 1 are replaced by triangular or arcuate profiles 19 and 20, respectively, whose side walls facing the photoelectric element are provided with a reflective layer. The cross-section of these profiles fills the space which is enclosed by the light rays passing through the camera objective and which are in part reflected onto the photoelectric element. These profiles may be made of a transparent material, e.g. glass or plastics, or of a metallic material. The surfaces of these profiles which do not take part in the reflection are preferably blackened. The profiles may be individually inserted in the base plate 8''' and the arrangement may be chosen so that the reflecting surfaces are inclined to each other at different angles for the purpose of concentrating the reflected light beam upon the photoelectric element. It is also possible, of course, to make the profiles with the base plate in one piece.

Figure 5:
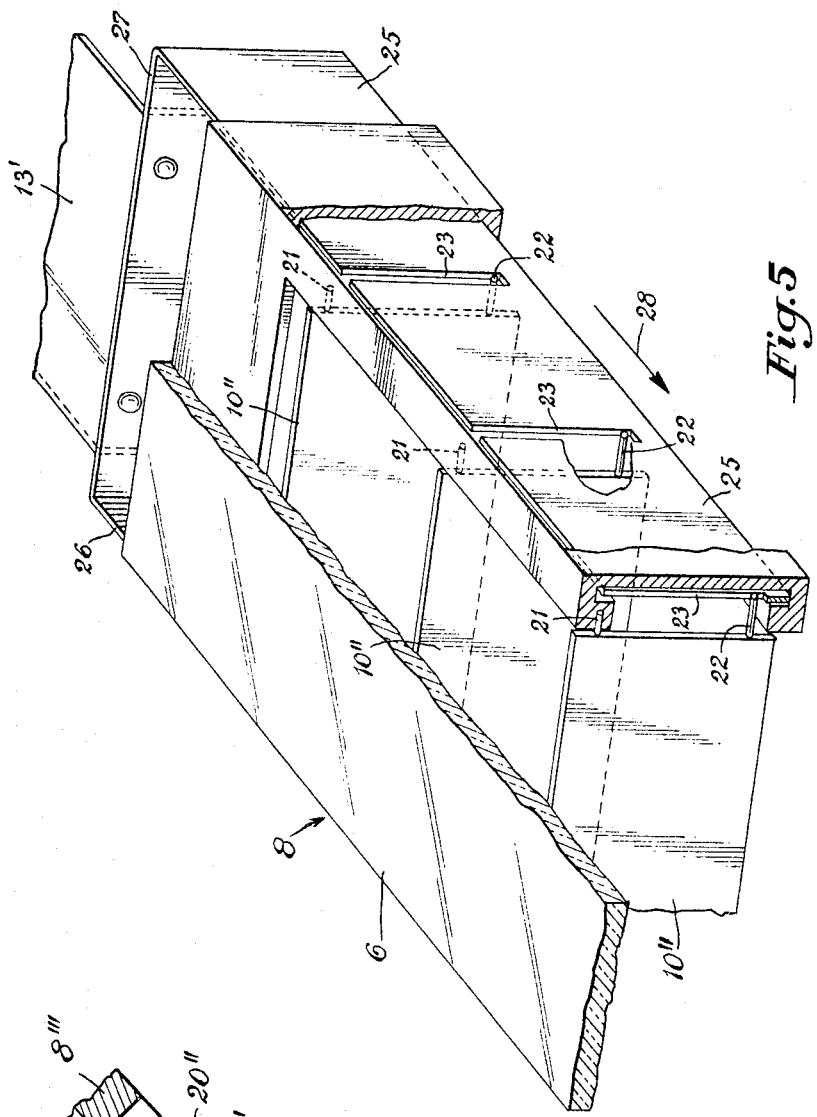

FIG. 5 shows another example of application of the invention. As the carrier of the reflecting layers serve the laminations 10'' which on their borders carry each two pins 21 and 22. The pins 21 are pivoting in the housing 8 of the mirror carrier, whereas the pins 22 engage into the slots 23 provided in slides, which are fitted on both sides of the mirror carrier to work in the direction of the arrow 28. These two slides 25 and 26 are connected by means of the bridge 27 to which the flexible strap 13' is attached corresponding to the one shown in FIG. 1, No. 13.

When the mirror flips up the slides 25 and 26 are moved in the direction of the arrow 28. At the same time the laminations 10'', controlled by the pins 22, rotate around the pins 21, until one lamination lies on the following lamination. Thereby the transmission of light through the mirror carrier is stopped when the mirror is in the upper position.

Figure 6:
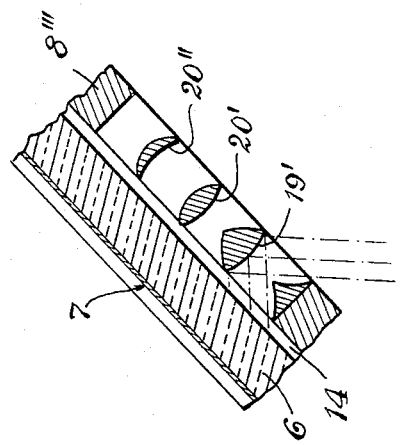

FIG. 6 shows the bars according to FIG. 4. The reflecting layers 19', 20' are convex, and the reflecting layers 20'' are concave.

What we claim is:

1. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said patrly transparent mirror so as to be pivotally moved with the latter, said light beam deflecting means comprising a pluraltiy of spaced reflective surfaces arranged transversely in the path of said light beam, said reflective surfaces being formed on metallic strips which are fixedly attached to said partly transparent mirror, each one of said reflective surfaces deflecting a portion of the light beam employed for measuring the light onto said photoelectric element independently of the adjacent reflective surfaces.

2. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced reflective surfaces arranged transveresly in the path of said light beam, said light reflective surfaces being formed on strips made of a synthetic plastic which are fixedly attached to said partly transparent mirror, each one of said reflective surfaces deflecting a portion of the light beam employed for measuring the light onto said photoelectric element independently of the adjacent reflective surfaces.

3. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, and means for covering said plurality of spaced light reflective surfaces to prevent the passage of light rays therethrough when said camera is in a position ready for an exposure of the film by the light beam passing through the camera objective.

4. A camera according to claim 3, including slot means arranged between said partly transparent mirror and said plurality of spaced light reflective surfaces, and a flexible shutter strip slidably mounted in said slot means for covering said light reflective surfaces when the same are moved with said mirror into a position permitting an exposure of the film.

5. A camera according to claim 3, including slot means arranged between said partly transparent mirror and said plurality of spaced light reflective surfaces, and a flexible shutter strip secured with one of its ends to the camera adjacent said viewfinder and slidably mounted in said slot means for covering said light reflective surfaces when the same are moved with said mirror into a position permitting an exposure of the film.

6. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which said plurality of spaced light reflective surfaces are formed on straight bars having a semi-circular cross-section (20).

7. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which said plurality of spaced light reflective surfaces are formed on straight bars having a triangular cross-section (19).

8. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which said plurality of spaced light reflective surfaces are differently inclined with respect to the incident light rays so as to deflect the light rays in different angular directions onto said photoelectric element.

9. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which at least some of said spaced light reflective surfaces are convex.

10. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which at least some of said spaced light reflective surfaces are concave.

11. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, said light beam deflecting means comprising a plurality of spaced light reflective surfaces arranged transversely in the path of said light beam, each one of said reflective surfaces deflecting a portion of the light beam employed for measuring the light onto said photoelectric element independently of the adjacent reflective surfaces, in which said light deflecting means comprises a plurality of prisms (17) which are arranged in such a manner that one of the faces of said prisms totally deflects the light rays passing through said camera objective into the direction of said photoelectric element.

12. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, and including a Venetian-blind-type diaphragm (12) arranged in front of said photoelectric element for preventing a reflection of light rays toward the film in said camera.

13. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted inside said camera casing on the bottom wall thereof, and pivotally mounted light beam deflecting means for directing a portion of the light beam entering said camera through said camera objective onto said photoelectric element, said light beam deflecting means being arranged on the rear of said partly transparent mirror so as to be pivotally moved with the latter, and including a shutter means movable toward and away from said viewfinder and operatively connected with said pivotally mounted partly transparent mirror, whereby said shutter means is moved into operative position to cover up said viewfinder and render it inoperative when the camera objective is ready to make an exposure of said film.

14. In a single lens mirror reflex camera having a camera objective arranged on the front wall of a camera casing, a viewfinder, a pivotally mounted partly transparent mirror for reflecting a portion of the light beam passing through said camera objective into said viewfinder, a photoelectric element mounted fixedly inside said camera casing on the bottom wall thereof, and light beam deflecting means for directing a portion of the light beam entering said camera through said camera objective onto said photoelectric element, said light beam deflecting means being fixedly mounted on the rear of said partly transparent mirror so as to be pivotally moved with the latter.

References Cited by the Examiner

UNITED STATES PATENTS

| | | | |
|---|---|---|---|
| 3,080,803 | 3/1963 | Uno | 95—10 |
| 3,093,044 | 6/1963 | Ledezner | 95—10 |
| 3,176,312 | 3/1965 | Reinsch | 95—10 X |

JOHN M. HORAN, *Primary Examiner.*